(12) United States Patent
Snell

(10) Patent No.: US 6,985,282 B2
(45) Date of Patent: Jan. 10, 2006

(54) EFFICIENT OPTICAL PARAMETRIC OSCILLATOR WITH PHOTON RECYCLING

(75) Inventor: Kevin J. Snell, Chelmsford, MA (US)

(73) Assignee: BAE Systems Information and Electronics Systems Integration Inc., Nashua, NH (US)

( * ) Notice: Subject to any disclaimer, the term of this patent is extended or adjusted under 35 U.S.C. 154(b) by 215 days.

(21) Appl. No.: 10/652,544

(22) Filed: Aug. 29, 2003

(65) Prior Publication Data

US 2005/0046924 A1 Mar. 3, 2005

(51) Int. Cl.
*G02F 1/39* (2006.01)
*H01S 3/109* (2006.01)

(52) U.S. Cl. .................................. 359/330; 372/22
(58) Field of Classification Search ......... 359/326–332; 372/21, 22
See application file for complete search history.

(56) References Cited

U.S. PATENT DOCUMENTS 5,400,173 A * 3/1995 Komine .................... 359/330
5,574,557 A * 11/1996 Bjork et al. ............... 356/450

* cited by examiner

*Primary Examiner*—John D. Lee
(74) *Attorney, Agent, or Firm*—Robert K. Tendler; Daniel J. Long

(57) ABSTRACT

The problem of the low efficiency of large quantum defect optical parametric oscillators is solved by recycling unused photons in a process involving pumping additional parametric processes having a common resonant wavelength. In order to improve the efficiency, a series of optical parametric oscillators are pumped with unused signal photons which exist at the output of a previous optical parametric oscillator that generates both signal and idler outputs, with the idler constituting the desired output.

20 Claims, 1 Drawing Sheet

EFFICIENT OPTICAL PARAMETRIC OSCILLATOR WITH PHOTON RECYCLING

FIELD OF INVENTION

This invention relates to efficient pumping of optical parametric oscillators and more particularly to the provision of a system which locates a number of optical parametric oscillators in a cavity, with photon recycling used to increase pumping efficiency.

BACKGROUND OF THE INVENTION

It has long been desired to develop a long wave infrared source which is also solid state. Applications for such long wave lasers include infrared countermeasures, and targeting systems as well as biochemical detection using laser spectroscopy. In order to provide long wave infrared radiation, one starts at a moderately short wavelength of about 2 microns. It is then necessary to be able to convert the 2 micron pumping energy to the 8 to 12 micron band.

Intrinsically this is not a very efficient process because one is starting with 2 micron photons and trying to obtain 8 microns. As a result there is a very large quantum defect, relating to the difference in wavelength between the pumping radiation and the desired output. The typical way of addressing the quantum defect problem is to utilize an optical parametric oscillator which is a non-linear optical device in which one pumps the non-linear optical crystal in the oscillator at one wavelength to obtain an output at another wavelength.

One type of non-linear optical crystal is a zinc germanium phosphide crystal which when pumped at around 2 microns using a Holmium laser results in a non-linear process, called a parametric process, where one creates pump photons which split into two photons. With conservation of energy, the two photons split up into energies that add up to that which is equal to the energy of the pump photon. However for this to occur, one needs phase matching. Phase matching occurs where one has indices in the crystal for the various waves and are such that all the waves can grow together in phase. If one does not have that condition, then what happens is that the generated waves convert back into the pump wavelength and one does not obtain much generation.

However, if one can get into a condition where the waves are in phase, the waves continue to grow. Thus it is an important part of the process to have phase matching.

Once one has phase matching for the wavelengths of interest in the non-linear crystal, one can enclose the crystal in an optical resonator which then allows waves to build from noise and to do so more efficiently than it would if one where going single pass through the crystal.

One can resonate either the signal wavelength or the idler wavelength. If only one wavelength is resonated it is commonly called singly resonated or the optical parametric amplifier is called a singly resonant optical parametric oscillator, SRO. With an optical parametric oscillator one can resonate both waves, both the signal and idler, and get what is called a doubly resonant oscillator. However, this does not turn out to be advantageous because it is very unstable. However, it does result in a much lower lasing threshold.

Referring now to the use of singly resonant oscillators, if one utilizes a single crystal pumped at for instance 2 microns and one wants to shift the output to 8 microns, one normally obtains the shifted signal in a parametric process. In such a process one obtains perhaps 50% conversion efficiency, meaning the power conversion efficiency from pump to signal and idler combined. If one then factors in the quantum defect, one is only obtaining 10% of the total pump power out in the long wave 8 micron infrared output.

The result is that a significant amount of power is not being used because it is going into the signal as opposed to the idler. In one example, a signal wavelength may, for instance, be at 2.8 microns. However, the signal is not contributing to the process and in general it simply escapes out to the rest of the world.

The result is that the idler signal comes out of the optical parametric amplifier at only a tenth of the input pump power.

In order to solve the problem of efficiency, in the past single optical parametric oscillators called tandem optical parametric oscillators have been cascaded. This results in two discrete optical parametric oscillators, each in a separate cavity. The disadvantage is that it is a complex system because one has multiple resonant cavities. Secondly, efficiency of the type desired cannot be met due to the wastage of photons, namely signal photons to which the cavities are not tuned and which do not contribute to the idler.

SUMMARY OF THE INVENTION

In the subject invention wasted or unused photons are collected and reused through locating a number of non-linear large phased matched range crystals in a single cavity in which signal wavelength photons are utilized to pump the next downstream optical parametric amplifier.

Thus, the subject system positions one or more additional optical parametric oscillators in a single cavity to take the unused signal and provide it as a pump for a follow-on parametric process. Each of the optical parametric amplifiers in the cavity generates photons at both signal and idler wavelengths, with the idler wavelength for each of the optical parametric oscillators in one embodiment being identical and at the desired long infrared wavelength. The first process generates its own signal, and when one continues to cascade the interactions, one recovers or recycles unused signal photons to pump a downstream optical parametric oscillator.

The result is a buildup of idler power with each successive parametric process. This means that the idler power from the first optical parametric oscillator is added to the idler power from the next optical parametric oscillator It is noted that the common resonant cavity is set for the idler wavelength and in one embodiment is set to the long wave infrared desired.

One therefore takes advantage of a common idler field to effectively buildup the parametric processes in the other cascaded optical parametric oscillators. Thus the location of the optical parametric oscillators in a single cavity tuned to the longer wavelength, in this case the idler wavelength, permits recapture of unused signal photons. This in one embodiment, can double the efficiency of the process.

The result is that the subject system is much less complex than the prior art tandem optical parametric oscillator configurations in which the output of one optical parametric oscillator in a first cavity is injected into another optical parametric oscillator in a second cavity.

Not only does one not have to buildup in multiple resonant cavities when utilizing the subject invention, the wavelength that one wants to see gain at is the idler wavelength which is already present when going to subsequent optical parametric oscillators. Since the idler wave is already present, the process builds up together, whereas with tandem optical parametric oscillators one has to buildup a first optical parametric oscillator process and then use that to pump the next one.

In the tandem optical parametric oscillators one is not recycling photons in the sense that if one were recycling, one would have to have two independent beam lines. In the subject system, all processes combine in a common beam line.

More particularly, the preferred approach to all-solid-state LWIR generation is to use a MWIR-pumped optical parametric oscillator to directly generate 8 to 12 $\mu$m radiation. The overwhelming disadvantage of this process is the large quantum defect between the pump (diode or 2 $\mu$m) and the LWIR band which results in a direct 2.1 $\mu$m to 8.8 $\mu$m conversion efficiency of about 11% or about 2% wall-plug efficiency (Tm:Ho/OPO). This argues strongly for the use of a CO2 laser to emit directly in the LWIR band if there is sufficient space in the package; hence the need for small laser volume in the other bands. An alternative is to recycle the unused photons in the MWIR-pumped optical parametric oscillator process by using these to pump additional optical parametric oscillator stages. Assuming 50% power conversion efficiency per stage, the cumulative 8.8 $\mu$m efficiency is 11.9% at the first stage, 17.8% at the second stage and 20.5% at the third stage. Hence, the efficiency of the optical parametric oscillator process may be nearly doubled by adding two additional stages, yielding a total 8.8 $\mu$m output of 8.2-W for 40-W of 2.1 $\mu$m pump. All of these stages may be enclosed within a common idler resonant optical parametric oscillator cavity. Singe frequency operation for coherent detection may then be obtained by seeding at the idler wavelength.

In summary, the problem of the low efficiency of large quantum defect optical parametric oscillators is solved by recycling unused photons in a process involving pumping additional parametric processes having a common resonant wavelength. In order to improve the efficiency, a single pumping laser is utilized either in a ring or linear configuration in which a series of optical parametric oscillators are pumped with unused signal photons which exist at the output of a previous optical parametric oscillator that generates both signal and idler outputs, with the idler constituting the desired output. In one embodiment, a Holmium pump laser at 40-W produces a 2.1 $\mu$m output which is used to pump a first optical parametric oscillator that is non-linear and has a large phase match range crystal, namely ZGP. The output from the first optical parametric oscillator is a 2.8 $\mu$m signal and the desired 8.8 $\mu$m idler comes out at 4.8-W. The output from the first optical parametric oscillator pumps the second optical parametric oscillator with the unused 2.8 $\mu$m signal photons, with the resultant output from the second optical parametric oscillator being a 4.0 $\mu$m signal and the 8.8 $\mu$m idler at an additional 2.3-W. The 4.0 $\mu$m signal pumps the third optical parametric oscillator so as to produce a 7.3 $\mu$m signal and the 8.8 $\mu$m idler comes out at an additional 1.1-W. The combined output power of the idler totals 8.2-W for an overall efficiency of 20%.

BRIEF DESCRIPTION OF THE DRAWINGS

These and other features of the subject invention will be better understood in connection with the Detailed Description in conjunction with the Drawings, of which.

DETAILED DESCRIPTION

Figure 1:
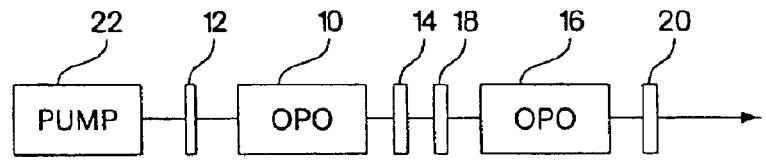
FIG. 1 is a block diagram of a prior art tandem optical parametric oscillator arrangement in which each of the optical parametric oscillators are located in their own cavity, with one optical parametric oscillator having its output pumping the second optical parametric oscillator.

Referring now to FIG. 1, in a prior art tandem optical parametric oscillator configuration, a first optical parametric oscillator 10 is located in a cavity bounded by mirrors 12 and 14, whereas a second parametric oscillator 16 is located in the cavity bounded by mirrors 18 and 20. The first of the tandem optical parametric oscillators is pumped by a pump 22, with the output of the optical parametric oscillator 10 pumping optical parametric oscillator 16.

The system in FIG. 1 while capable of converting pump wavelengths into longer wavelengths, results in an overall efficiency of no greater than 10%. This means that if the pumping power is 40-W, the output power for the tandem system is only 4-W.

Figure 2:
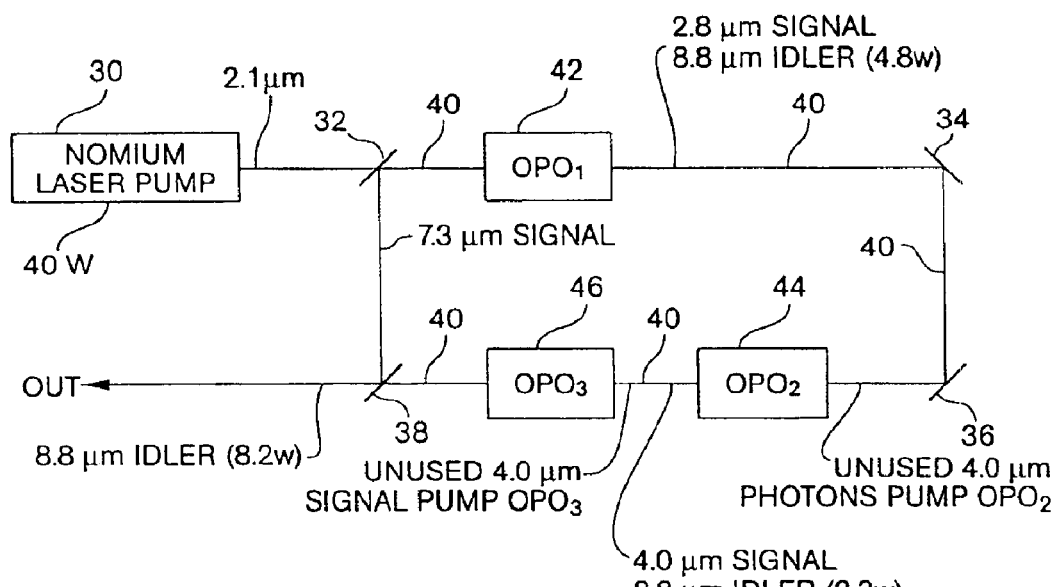
FIG. 2 is a block diagram showing the subject common cavity optical parametric oscillator combination in a ring configuration; and, FIG. 3 is a block diagram illustrating the unfolding of the ring configuration of FIG. 2 into a linear equivalent.

Referring to FIG. 2, unused signal photons may be reintroduced to pump follow-on optical parametric oscillators as will be described.

In this figure a Holmium pump laser 30 produces a 2.1 $\mu$m 40-W output coupled into a ring cavity defined by mirrors 32, 34, 36 and 38. The output from pump laser 30 exits as beam 40. This beam is introduced into an optical parametric oscillator 42 which has a non-linear crystal. Note that this non-linear crystal has a large phase match range, and in one embodiment is a ZGP crystal.

The output from optical parametric oscillator 42 is at a signal wavelength of 2.8 $\mu$m, and also at an 8.8 $\mu$m idler wavelength. The output power of the idler is 4.8-W.

The output of optical parametric oscillator 42 is introduced into optical parametric oscillator 44 such that the 2.8 $\mu$m signal photons that are unused at this point, are utilized to pump optical parametric oscillator 44. Optical parametric oscillator 44 has the same ZGP crystal, with the output of optical parametric oscillator 44 being a 4.0 $\mu$m signal, and again the same 8.8 $\mu$m idler. At this point the idler has an additional 2.3-W, for a total idler power of 7.1-W.

The output of optical parametric oscillator 44 is introduced to a third optical parametric oscillator 46, again having a non-linear crystal such as ZGP. In this case, unused signal 4.0 $\mu$m photons are used to pump optical parametric oscillator 46 which outputs a 7.3 $\mu$m signal reflected back into the ring by mirror 38. Mirror 38 is also coated to output the 8.8 $\mu$m idler at 1.1-W, with combined idler power totaling 8.2-W. It will be appreciated that 8.2-W constitutes an overall efficiency of 20%, as opposed to 10% for the tandem oscillator configuration of FIG. 1.

Note that mirror 38 is coated such that a certain amount of the 8.8 $\mu$m idler is transmitted out, whereas the other portion of the 8.8 $\mu$m idler is reflected back into the ring and thus back into the single cavity to resonate. It will be appreciated that mirrors 32, 34, 36 and 38 are provided with the appropriate dielectric coatings having tailored transmission and reflection characteristics. As such mirrors 32, 34, 36 and 38 are respectively provided with the following coatings: (PLEASE FILL IN.)

The number of optical parametric oscillator which follow the original optical parametric oscillator are not limited in number, with the more optical parametric oscillators that one utilizes the more of the unused photons that are recycled, making the process evermore efficient. However, utilizing more than three optical parametric oscillators in the above case may not be useful because in going beyond three steps to a next step one would be pumping a fourth optical parametric oscillator with a 7.3 µm signal to get an 8.8 µm idler out. At this point one is not recovering much additional power, keeping in mind that each of the processes is not going to be much more than 50% efficient.

In the above example the first optical parametric oscillator process by itself is about 11% efficient. Adding the second process increases the overall efficiency to about 17%; and then adding the third process increases the efficiency by only 3% more, to about 20%. Thus there are diminishing returns with the inclusion of additional optical parametric oscillators.

Figure 3:
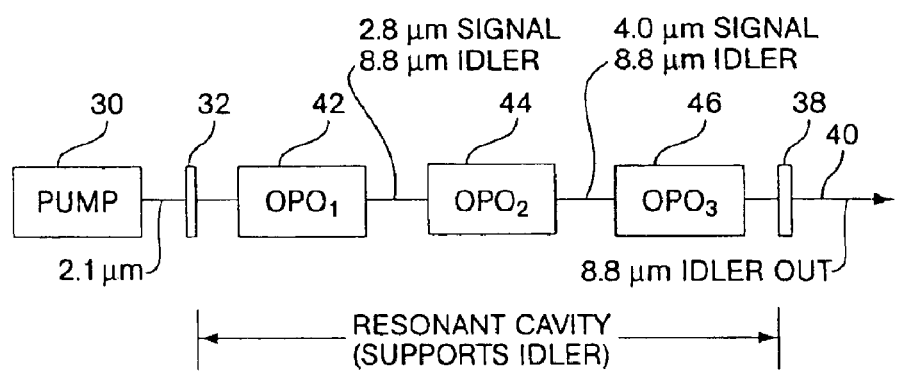

Referring to FIG. 3, the ring configuration of FIG. 2 can be unfolded into a linear configuration in which like reference characters refer to like elements between the two figures. Here it can be seen that the resonant cavity is between mirrors 32 and 38, with the three optical parametric oscillators 42, 44 and 46 being located on a single beam line 40, as was the case in the FIG. 2 embodiment.

As mentioned before, the ability to provide long wave infrared coherent radiation is useful in infrared countermeasures which are designed to seek out threats. In general such systems include targeting systems which have forward looking infrared beams operating in the long infrared wavelength band.

Note also that long wavelength light is commonly used to do biochemical detection and more specifically used in laser spectroscopy to find various chemical agents or biological agents.

While the subject system has been described in connection with long wave infrared signals, the subject system may be utilized in the near infrared and visible regions of the electromagnetic spectrum. In fact, the subject system may be utilized anytime one wishes to recover a large quantum defect between the pump and the desired wavelength that one is generating.

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

What is claimed is:

1. Apparatus for improving the conversion efficiency of optical parametric oscillator having a low conversion efficiency due to the difference between the pumping and signal and idler wavelengths, comprising:
   a cascaded series of optical parametric oscillators located in a common optical cavity tuned to a predetermined resonant wavelength, each of said optical parametric oscillators having a non-linear crystal; and,
   a pump laser for pumping the first of said optical parametric oscillators at a wavelength to generate photons at an idler wavelength and a signal wavelength in a parametric process in which pump photons are split into two photons, each having a different one of said idler and signal wavelengths, the output of said first optical parametric oscillator being introduced into the next parametric oscillator, with unused signal photons being used to pump said next optical parametric oscillator, said next optical parametric oscillator having an idler wavelength output having a power which is the sum of the idler outputs of said first and next optical parametric oscillators, whereby unused photons from the first optical parametric oscillator pump a subsequent optical parametric oscillator to promote photon recycling.

2. The apparatus of claim 1, wherein said non-linear crystals support a large phase match range.

3. The apparatus of claim 1, wherein said large phase match range non-linear crystals include zinc germanium phosphide.

4. The apparatus of claim 1, wherein said optical parametric oscillators are singly resonant.

5. The apparatus of claim 1, wherein at least one of said optical parametric oscillators is doubly resonant.

6. The apparatus of claim 1, wherein the optical parametric oscillators have a large quantum defect.

7. The apparatus of claim 1, wherein said optical parametric oscillators are located on a single beam line.

8. The apparatus of claim 1, wherein said pump laser and said optical parametric oscillators are all solid state.

9. The apparatus of claim 1, wherein said idler wavelength is in the LWIR band.

10. The apparatus of claim 1, wherein said idler wavelength is 8.8 µm.

11. The apparatus of claim 1, wherein said pump wavelength is 2.1 µm.

12. The apparatus of claim 11, wherein said pump laser is a Holmium laser.

13. The apparatus of claim 1, wherein the conversion efficiency per parametric process for each of said optical parametric oscillators is 50%.

14. The apparatus of claim 1, wherein three optical parametric oscillators are used and wherein the overall conversion efficiency is nearly doubled over a single optical parametric oscillator.

15. A method for improving the overall conversion efficiency of a parametric process for production of higher power laser beams, comprising the steps of:
   cascading a number of optical parametric oscillators in a common cavity tuned to the desired laser output wavelength; and,
   pumping the first of the cascaded optical parametric oscillators such that unused photons from a preceding optical parametric oscillator are used to pump a following optical parametric oscillator.

16. The method of claim 15, wherein said optical parametric oscillators have large phase match range non-linear crystals.

17. The method of claim 15, wherein all optical elements are solid state.

18. The method of claim 17, wherein the output beam wavelength is in the LWIR band.

19. An LWIR solid state laser, comprising:
   a number of optical parametric oscillators cascaded in a common cavity; and,
   a laser for pumping the first of said optical parametric oscillators at a predetermined wavelength such that unused photons from one optical parametric oscillator at said predetermined wavelenght are used to pump a subsequent optical parametric oscillator, thereby to increase the conversion efficiency over a single optical parametric oscillator.

20. The laser of claim 19, wherein three optical parametric oscillators are located in said cavity, whereby the conversion efficiency is almost double that associated with a single parametric process in a single parametric oscillator.

* * * * *

UNITED STATES PATENT AND TRADEMARK OFFICE
CERTIFICATE OF CORRECTION

PATENT NO. : 6,985,282 B2
DATED : January 10, 2006
INVENTOR(S) : Katherine J. Snell It is certified that error appears in the above-identified patent and that said Letters Patent is hereby corrected as shown below:

<u>Title page,</u>
Item [75], Inventors, delete "Kevin J. Snell" and replace with -- Katherine J. Snell --.

Signed and Sealed this

Twenty-eighth Day of March, 2006

JON W. DUDAS
*Director of the United States Patent and Trademark Office*

UNITED STATES PATENT AND TRADEMARK OFFICE
CERTIFICATE OF CORRECTION

PATENT NO. : 6,985,282 B2 Page 1 of 1
DATED : January 10, 2006
INVENTOR(S) : Snell It is certified that error appears in the above-identified patent and that said Letters Patent is hereby corrected as shown below:

Column 4,
Lines 60-62, delete "As such mirrors 32, 34, 36 and 38 are respectively provided with the following coatings: (PLEASE FILL IN.)".

Signed and Sealed this

Sixth Day of June, 2006

JON W. DUDAS
*Director of the United States Patent and Trademark Office*